United States Patent [19]

Wedman et al.

[11] 4,415,821

[45] Nov. 15, 1983

[54] DYNAMIC MAGNETIC PRELOAD BEARING STRUCTURE FOR A LINEAR MOTOR

[75] Inventors: Leonard N. Wedman, Radford, Va.; Joseph A. Bourque, Saratoga, Calif.

[73] Assignee: Kollmorgen Technologies Corporation, Dallas, Tex.

[21] Appl. No.: 376,655

[22] Filed: May 10, 1982

[51] Int. Cl.³ .............................................. H02K 41/00
[52] U.S. Cl. ........................................ 310/12; 310/14
[58] Field of Search ...................... 310/12–14, 310/30; 335/229, 230

[56] References Cited

U.S. PATENT DOCUMENTS

| | | | |
|---|---|---|---|
| 3,495,147 | 2/1970 | Flora | 310/14 X |
| 4,247,794 | 1/1981 | Jooss et al. | 310/13 |
| 4,260,914 | 4/1981 | Hertrich | 310/27 |
| 4,326,137 | 4/1982 | Brown et al. | 310/12 |
| 4,359,289 | 11/1982 | Barrus et al. | 310/12 X |
| 4,369,383 | 1/1983 | Langley | 310/12 |
| 4,377,761 | 3/1983 | Staciokas | 310/12 |

*Primary Examiner*—Donovan F. Duggan
*Attorney, Agent, or Firm*—Morgan, Finnegan, Pine, Foley & Lee

[57] ABSTRACT

A bearing structure for use in a linear motor or actuator including only a single guide rod in combination with a freely moving ball bearing. When used in a permanent magnet motor, the magnetic flux of the motor is used to preload the ball bearing to maintain a relatively constant bearing loading and to maintain the ball bearing in position.

11 Claims, 3 Drawing Figures

DYNAMIC MAGNETIC PRELOAD BEARING STRUCTURE FOR A LINEAR MOTOR

This invention relates to an electrical motor bearing structure and more particularly, to a bearing structure for a brushless linear motor with a moving permanent magnet.

BACKGROUND OF THE INVENTION

Linear electric motors usually require a guide structure to provide a carriage or slider for the moving portion of the motor so as to maintain a uniform air gap throughout the linear travel. Control of the lateral position in the air gap is required and, moreover, when a flat moving component is involved, it is also necessary to eliminate any rotation. In the past, carriages or sliders for the armatures of linear motors have been made using parallel guide rods and linear bearings.

An object of this invention is to provide a bearing structure for a linear electrical motor which provides improved positioning accuracy and lower system friction.

Another object of the invention is to provide a linear bearing structure for an electric motor which makes effective use of the resident magnetic forces of the motor without detracting from the motor performance.

SUMMARY OF THE INVENTION

The bearing structure for the linear motor according to this invention includes a single guide rod with one or more cooperating linear bearings. By using only a single guide rod, alignment problems and lateral skewing problems associated with parallel guide rod arrangments are eliminated. A freely moving ball bearing is used in place of the second guide rod and is operative to prevent rotation of the carriage. The ball bearing is maintained between a groove and a flat plane surface. The moving permanent magnet in the motor is offset within the air gap so that the resident magnetic force provides a preload to the bearing so as to retain the bearing structure and to maintain relatively constant bearing loading.

DETAILED DESCRIPTION

Figure 1:
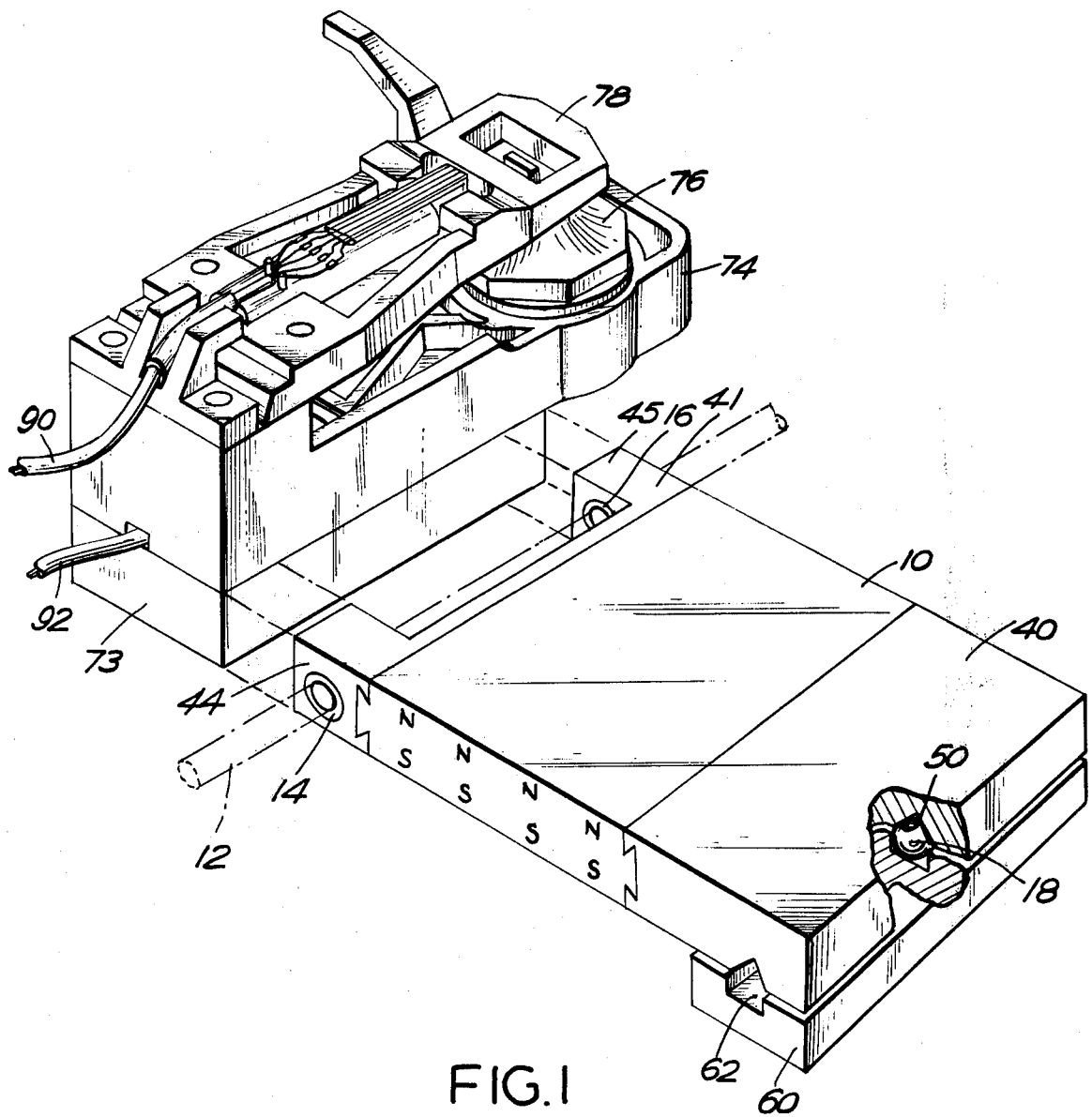
FIG. 1 is a perspective view illustrating the carriage for the moving permanent magnet of the motor including the bearing structure according to the invention.
Figure 2:
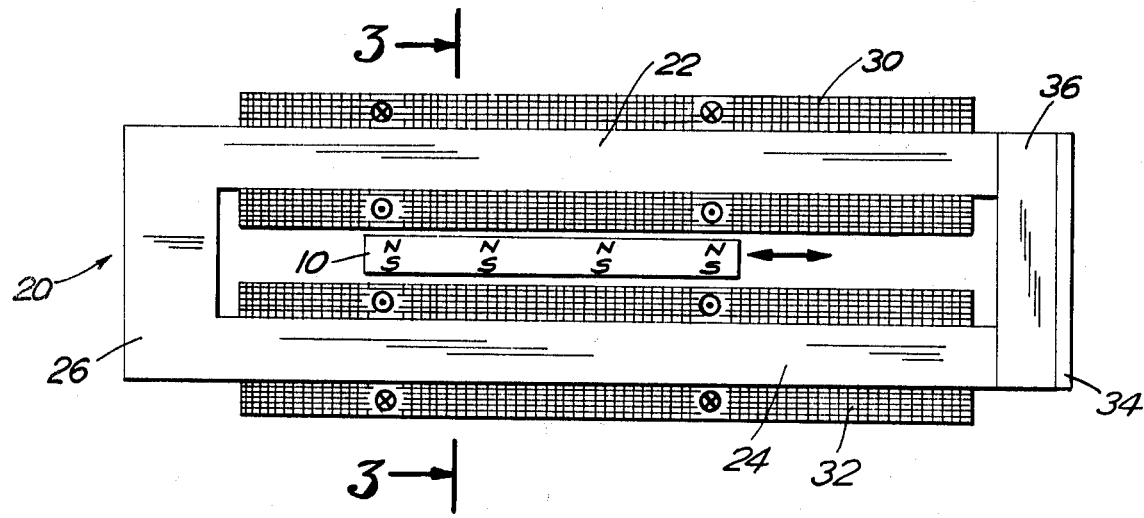
FIG. 2 is a longitudinal cross-section illustrating the stator windings for the linear motor in combination with the moving permanent magnet.
Figure 3:
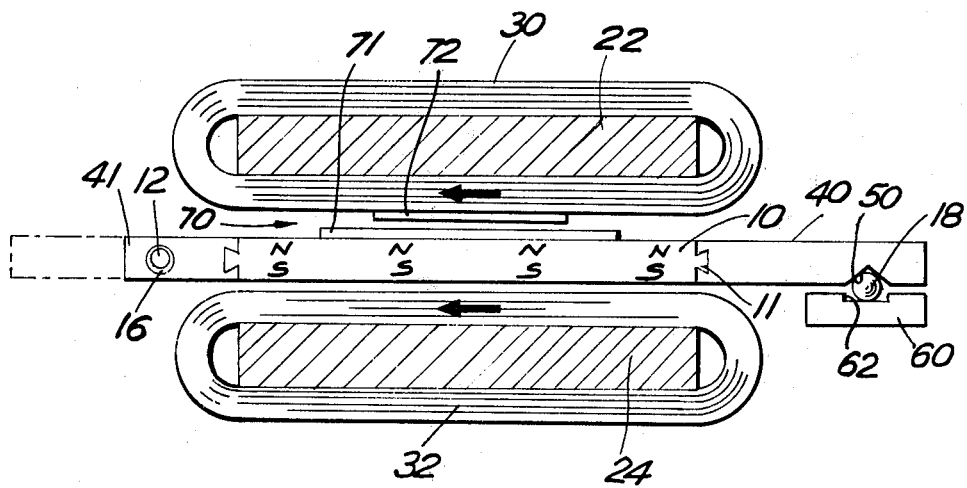
FIG. 3 is a cross sectional view along line 3—3 in FIG. 2.

FIGS. 1-3 illustrate one embodiment of a linear motor including the preloaded bearing structure according to the invention. The moving element includes a permanent magnet 10 magnetized transversely of the direction of movement, i.e., top to bottom as shown in FIG. 1. The carriage for the magnet is positioned by a guide rod 12 and cooperating linear bearings 14 and 16 one one side of the magnet and a ball bearing 18 on the other side of the motor.

The stator portion of the motor shown in FIGS. 2 and 3 includes a U-shaped core 20 with parallel legs 22 and 24 connected by a bridge portion 26. Legs 20 and 24 extend in the direction parallel to the axis of movement. The core is made of magnetic material and can be sintered iron or laminated iron depending on the eddy current and hysteresis characteristics required. The magnetic flux of permanent magnet 10 emerges from the north pole surface (top of the magnet as shown in FIG. 2), crosses the air gap and then passes through leg 22, bridge portion 26, and leg 24, back across the air gap to the south pole surface of the magnet.

The legs of the core are surrounded by bobbin type windings 30 and 32. The windings are interconnected with one another so that current flows clockwise around one leg and counter-clockwise around the other. With this connection, current flow in both windings is in the same direction for the portion within the air gap between legs 22 and 24. As viewed in FIG. 2 the current flow is toward the viewer on the portion within the air gap and, as viewed in FIG. 3, is from left to right as indicated by the arrows. As seen in FIG. 3 the windings are relatively flat so as to minimize the air gap between magnet 10 and legs 22 and 24. The overall structure, as seen in FIG. 3, including relatively flat windings, core structure and permanent magnets, results in a linear motor having a low profile.

The force moving the magnet in the longitudinal direction as indicated by the double headed arrow in FIG. 2 results from the interaction of the magnetic flux from magnet 10 and the current flow through the conductors within the air gap. The force generated is the product of the flux density of the permanent magnet, multiplied by the current in the winding and the effective length of the winding within the air gap.

When windings 30 and 32 are energized, they generate a magnetic flux in core 20 which has no useful effect on creating the linear movement. Accordingly, care should be taken to increase the reluctance of the path for this magnetic flux while at the same time not adversely affecting the reluctance of the path used by the flux from the permanent magnet. This is achieved by not magnetically closing the core structure between legs 22 and 24 at one end. To minimize fringing fields, however, a thin magnetic plate 34 is placed across the open end of the core but is separated from the ends of legs 22 and 24 by a nonmagnetic spacer 36. Spacer 36 is of a thickness selected to provide sufficient reluctance in the loop to avoid magnetic saturation from the winding flux.

The permanent magnet is preferably of a high energy type suitable for operation with a relatively large air gap sufficient to accommodate the windings of the motor. Preferably the permanent magnet is made from a samarium cobalt compostion sintered to form the desired magnet shape. Such magnets are known for their high energy and high coercive force characteristics ideal for large size air gap magnetic devices. As shown in FIGS. 1 and 3, the permanent magnet is magnetized so that the direction of flux is perpendicular to the direction of movement.

Carriage supports 40 and 41 are secured to the sides of the permanent magnet through dovetail slots which mate with the dovetail projections 11 and 12 on the magnet. Support 41 includes a pair of outwardly extending bearing projections 44 and 45. Projections 44 and 45 each include an aperture therein dimensioned to accommodate linear bearings 14 and 16 which cooperate with guide rod 51. The guide rod is suitably secured and positioned so that the permanent magnet and the carriage structure can move linearly between legs 22 and 24 (FIG. 2) of the linear motor.

Support for the magnet on the side opposite the guide rod is provided by ball bearing 18. A bearing support plate 40 is secured to magnet 10 by means of a dovetail slot which cooperates with projection 11 on the side of the magnet. A V-shaped groove 50 is machined into the lower suface of support 40 and is dimensioned to provide a race for ball bearing 18. A stationary bearing support 60 is machined to provide a recessed bearing surface 62. Although for illustration purposes the ends of groove 50 and recess 62 are shown open in FIG. 1, in an actual unit at least one of the groove or recess would be closed at the ends.

With this bearing arrangement magnet 10 is intentionally located off center closer to leg 24 of the magnet core so that there is always a net magnetic pull of the magnet carriage downwardly toward leg 24. This downward force maintains bearing plate 75 in contact with the ball bearing so that the ball bearing cannot fall out. Thus, the resident magnetic force of the motor is utilized to provide a preloading force for retaining the bearing.

As can be seen from the drawing, the guide rod and linear bearings confine movement of the carriage along a linear path parallel to the axis of the guide rod whereas the ball bearing and cooperating surfaces serve to prevent rotation of the carriage about the guide rod.

The carriage structure with a single guide rod and ball bearing combination reduces friction and eliminates alignment and skewing problems often encountered with parallel guide rods. Furthermore, by magnetically preloading the bearing utilizing the resident magnetic force of the motor itself the arrangement provides an effective ball bearing support without the need for the usual ball retaining structures.

The magnet carriage can be secured to move any desired object. In the illustrative embodiment of FIG. 1 the carriage is shown secured to the read/write head assembly for a flexible magnetic disk drive. The head assembly is mounted on a support block 73 secured to projections 44 and 45 as, for example, with adhesive. The lower portion of the read/write head 76 is molded into a lower head support 74 and the upper portion of the upper portion of the read/write head is molded into an upper head support 78. The upper head support is pivotally mounted relative to lower support 74. The read/write heads are electrically connected to the electronic reading and recording control circuits via leads 90 and 92. The upper and lower head portions can be separated sufficiently to slide over the edge of a magnetic disk and to engage the disk in the recording track area. The linear movement of the permanent magnet in the linear motor provides movement of the head assembly so that the read/write heads can be moved from track to track on the disk.

If the linear motor is used as part of a position servo system, a position transducer is preferably built into the motor. In FIG. 3 a position transducer 70 is shown located within the motor air gap and includes moving element 71 secured directly to the magnet and a stator element 72 secured to the surface of winding 30. The transducer elements are in the form of conductive patterns on the surface of a thin substrate such as may be produced using printed circuit techniques. The substrates bearing the conductor patterns are secured such as by adhesive. The stator and moving patterns are in the form of a similarly shaped capacitive plates interconnected by interleaved comb-like patterns. Relative movement between the elements of the transducer varies the capacitive coupling and, hence, position can be sensed in accordance with the amount of energy coupled between the elements. Such capacitively coupled positioned transducers are available from Farrand Industries, Inc., Valhalla, New York. It has been found that although the transducer is electrical in its operation, the transducer is virtually unaffected by the magnetic fields of the motor and can therefore be located within the motor air gap.

In actual practice the transducer elements can be very thin and take up very little air gap space. Preferably, in a linear motor arrangement such as illustrated where the permanent magnet is offset from the center, the transducer is located in the larger air gap which, in FIG. 3, is the air gap between permanent magnet 10 and leg 22.

A suitable servo system including the linear motor and transducer is described in copending application Ser. No. (405-46) filed on even date herewith.

While only one illustrative embodiment has been shown in detail, it should be obvious that there are other variations within the scope of this invention. The invention is more particularly defined in the appended claims.

We Claim:

1. In a linear motor the combination of:
   an electromagnetic stator winding;
   a permanent magnet linearly movable in accordance with energization of said stator winding;
   a linearly movable carriage, said permanent magnet being attached thereto;
   a guide rod and cooperating linear bearing attached to said carriage to confine movement of said carriage along a linear path;
   a ball bearing disposed to prevent rotation of said carriage about said guide rod; and
   said permanent magnet being so located that said carriage is urged towards said ball bearing.

2. A linear motor in accordance with claim 1 further including a U-shaped stator core and wherein said permanent magnet is linearly movable between the legs of said core, said permanent magnet being located off-center closer to one of said legs of said core to thereby provide a net force urging said carriage toward said ball bearing.

3. A linear motor in accordance with claim 1 further including a moving surface on said carriage and a stationary surface, and wherein said ball bearing is freely movable between said surfaces.

4. A linear motor in accordance with claim 3 wherein one of said surfaces is in the form of a longitudinal groove and the other of said surfaces is planar.

5. In a linear magnetic motor of the type including;
   a U-shaped stator core of magnetic material, including parallel legs;
   a winding around at least one leg of said core;
   a linearly movable carriage; and
   a permanent magnet attached to said carriage, movable parallel to said legs of said core and magnetized transversely so that flux of said magnet interacts with current flow through said winding to produce a force tending to move said magnet;
   the improvement comprising:
   a guide rod and cooperating linear bearing attached to said carriage to confine movement thereof along a linear path;
   a ball bearing disposed to prevent rotation about said guide rod; and wherein said permanent magnet is located closer to one of said legs of said core to urge said carriage toward said ball bearing.

6. A linear motor in accordance with claim 5 further including a moving surface on said carriage and a stationary surface, and wherein said ball bearing is freely movable between said surface.

7. A linear motor in accordance with claim 6 wherein one of said surfaces is in the form of a longitudinal groove and the other os said surfaces in planar.

8. A bearing structure for a linear actuating device comprising:
 a linearly movable carriage;
 a guide rod and cooperating linear bearing attached to said carriage to confine movement of said carriage along a linear path;
 means providing a stationary support surface;
 means forming part of said carriage providing a moving support surface; and
 a freely moving ball bearing located between said support surfaces and being operable to prevent rotation of said carriage about said guide rod.

9. A bearing structure according to claim 8 further including means urging one of said support surfaces toward the other of said support surfaces.

10. A bearing structure according to claim 9 wherein said means urging one of said support surfaces toward the other of said support surfaces is magnetic.

11. A bearing structure according to claim 10 wherein said linear actuating device includes a linear motor and wherein said magnetic means is part of said linear motor.

* * * * *